(12) United States Patent
Ahearn et al.

(10) Patent No.: US 9,292,985 B2
(45) Date of Patent: Mar. 22, 2016

(54) OPERATION COMMUNICATION SYSTEM (71) Applicant: Schlage Lock Company LLC, Indianapolis, IN (US)

(72) Inventors: John Robert Ahearn, Pasadena, CA (US); Joseph Wayne Baumgarte, Carmel, IN (US); Gabriel Daniel Focke, Indianapolis, IN (US); Michael Scott Henney, Indianapolis, IN (US)

(73) Assignee: Schlage Lock Company LLC, Indianapolis, IN (US)

( * ) Notice: Subject to any disclaimer, the term of this patent is extended or adjusted under 35 U.S.C. 154(b) by 137 days.

(21) Appl. No.: 13/969,414

(22) Filed: Aug. 16, 2013

(65) Prior Publication Data

US 2014/0049365 A1    Feb. 20, 2014

Related U.S. Application Data (60) Provisional application No. 61/684,114, filed on Aug. 16, 2012, provisional application No. 61/684,097, filed on Aug. 16, 2012.

(51) Int. Cl.
G08C 19/22    (2006.01)
G07C 9/00    (2006.01)

(52) U.S. Cl.
CPC ........ *G07C 9/00182* (2013.01); *G07C 9/00031* (2013.01); *G07C 9/00174* (2013.01); *G07C 9/00571* (2013.01); *G07C 9/00309* (2013.01)

(58) Field of Classification Search
CPC ........... G07C 9/00571; G07C 9/00309; G07C 9/00182; G07C 9/00563; G07C 9/0069
USPC ................... 340/5.51, 5.85, 5.61, 5.7, 870.07
See application file for complete search history.

(56) References Cited

U.S. PATENT DOCUMENTS

| | | | |
|---|---|---|---|
| 5,046,084 A | 9/1991 | Barrett et al. | |
| 5,654,696 A | 8/1997 | Barrett et al. | |
| 6,133,847 A * | 10/2000 | Yang | G05B 19/0426 340/12.25 |
| 6,407,779 B1 * | 6/2002 | Herz | H04N 5/44513 340/12.3 |
| 6,937,140 B1 | 8/2005 | Outslay et al. | |
| 6,968,153 B1 * | 11/2005 | Heinonen | H04W 88/04 370/338 |
| 7,933,945 B2 | 4/2011 | Krzyzanowski et al. | |
| 7,933,968 B1 * | 4/2011 | Zimmerman | H04L 41/0809 709/217 |
| 8,346,672 B1 * | 1/2013 | Weiner | H04W 12/06 708/64 |
| 8,494,576 B1 * | 7/2013 | Bye | G07C 9/00087 455/403 |
| 8,922,334 B2 * | 12/2014 | Hale | H04N 21/42226 340/1.1 |

(Continued)

*Primary Examiner* — Jennifer Mehmood
*Assistant Examiner* — Rufus Point
(74) *Attorney, Agent, or Firm* — Taft Stettinius & Hollister LLP (57) ABSTRACT

An operation communication system is provided including a server, a mobile device, and a reader device. The server and the reader device communicate data with one another via the mobile device. The mobile device may communicates with the reader device via Bluetooth, for example. The mobile device may communicate with the server via the Internet, for example. Associated methods, devices and apparatuses are also provided.

12 Claims, 4 Drawing Sheets

(56) References Cited

U.S. PATENT DOCUMENTS

| | | | |
|---|---|---|---|
| 2002/0002507 A1 | 1/2002 | Hatakeyama | |
| 2004/0119894 A1* | 6/2004 | Higgins | H04L 12/2805 348/734 |
| 2006/0170533 A1 | 8/2006 | Chioiu et al. | |
| 2007/0050259 A1 | 3/2007 | Wesley | |
| 2007/0130476 A1* | 6/2007 | Mohanty | H04L 63/068 713/191 |
| 2007/0290789 A1 | 12/2007 | Segev et al. | |
| 2009/0217361 A1* | 8/2009 | Crandell | G06F 21/32 726/5 |
| 2009/0259957 A1* | 10/2009 | Slocum | H04N 5/44591 715/765 |
| 2010/0017736 A1* | 1/2010 | Kim | G08C 17/02 715/771 |
| 2010/0062770 A1* | 3/2010 | Flynn | H04W 88/04 455/436 |
| 2010/0138764 A1* | 6/2010 | Hatambeiki | G08C 17/02 715/765 |
| 2010/0229194 A1* | 9/2010 | Blanchard | G06F 3/038 725/39 |
| 2010/0259611 A1* | 10/2010 | Keshavarzian | G07C 9/00111 348/143 |
| 2010/0283579 A1 | 11/2010 | Kraus et al. | |
| 2010/0298032 A1* | 11/2010 | Lee | G06F 1/1616 455/566 |
| 2011/0053557 A1* | 3/2011 | Despain | A47G 29/10 455/410 |
| 2011/0202415 A1 | 8/2011 | Casares et al. | |
| 2011/0246904 A1* | 10/2011 | Pinto | G06F 9/4445 715/740 |
| 2011/0311052 A1 | 12/2011 | Myers et al. | |
| 2012/0068817 A1 | 3/2012 | Fisher | |
| 2012/0072944 A1* | 3/2012 | Felt | H04N 21/47214 725/25 |
| 2012/0075062 A1* | 3/2012 | Osman | G09C 9/00087 340/5.61 |
| 2012/0084342 A1* | 4/2012 | Brown | H04N 21/2543 709/203 |
| 2012/0095791 A1 | 4/2012 | Stefik et al. | |
| 2012/0100868 A1 | 4/2012 | Kim et al. | |
| 2012/0129452 A1* | 5/2012 | Koh | G06Q 20/352 455/41.1 |
| 2012/0157080 A1 | 6/2012 | Métivier | |
| 2012/0280790 A1 | 11/2012 | Gerhardt et al. | |
| 2012/0287058 A1* | 11/2012 | Lee | G06F 3/1423 345/173 |
| 2013/0023240 A1* | 1/2013 | Weiner | H04W 12/06 455/411 |
| 2013/0031261 A1* | 1/2013 | Suggs | H04L 63/083 709/228 |
| 2013/0144792 A1* | 6/2013 | Nilsson | G06Q 20/20 705/67 |
| 2013/0165180 A1* | 6/2013 | Fukuda Kelley | G05B 19/02 455/556.1 |
| 2013/0212661 A1* | 8/2013 | Neafsey | G06F 21/45 726/6 |
| 2014/0007222 A1* | 1/2014 | Qureshi | G06F 21/10 726/16 |
| 2014/0049361 A1 | 2/2014 | Ahearn et al. | |
| 2014/0049363 A1 | 2/2014 | Ahearn et al. | |
| 2014/0049364 A1 | 2/2014 | Ahearn et al. | |
| 2014/0049366 A1 | 2/2014 | Vasquez | |

\* cited by examiner

OPERATION COMMUNICATION SYSTEM

CROSS-REFERENCE TO RELATED APPLICATIONS

The present application claims the benefit of U.S. Provisional Patent Application No. 61/684,114 filed Aug. 16, 2012 and U.S. Provisional Patent Application No. 61/684,097 filed Aug. 16, 2012, the contents of each application are incorporated herein by reference in their entirety.

BACKGROUND

Various systems may be employed for providing information to a server or to a reader device. Some existing systems have shortcomings relative to certain applications. Accordingly, there remains a need for further contributions in this area of technology.

SUMMARY

One embodiment of the present application is a unique communication system. Other embodiments include apparatuses, systems, devices, hardware, methods, and combinations for communicating. Further embodiments, forms, features, aspects, benefits, and advantages of the present application shall become apparent from the description and figures provided herewith.

BRIEF DESCRIPTION OF THE FIGURES

The description herein makes reference to the accompanying figures wherein like reference numerals refer to like parts throughout the several views, and wherein.

DETAILED DESCRIPTION OF REPRESENTATIVE EMBODIMENTS

For the purposes of promoting an understanding of the principles of the invention, reference will now be made to the embodiments illustrated in the drawings and specific language will be used to describe the same. It will nevertheless be understood that no limitation on the scope of the invention is hereby intended. Any alterations and further modifications in the described embodiments, and any further applications of the principles of the invention as described herein are contemplated as would normally occur to one skilled in the art to which the invention relates.

Figure 1:
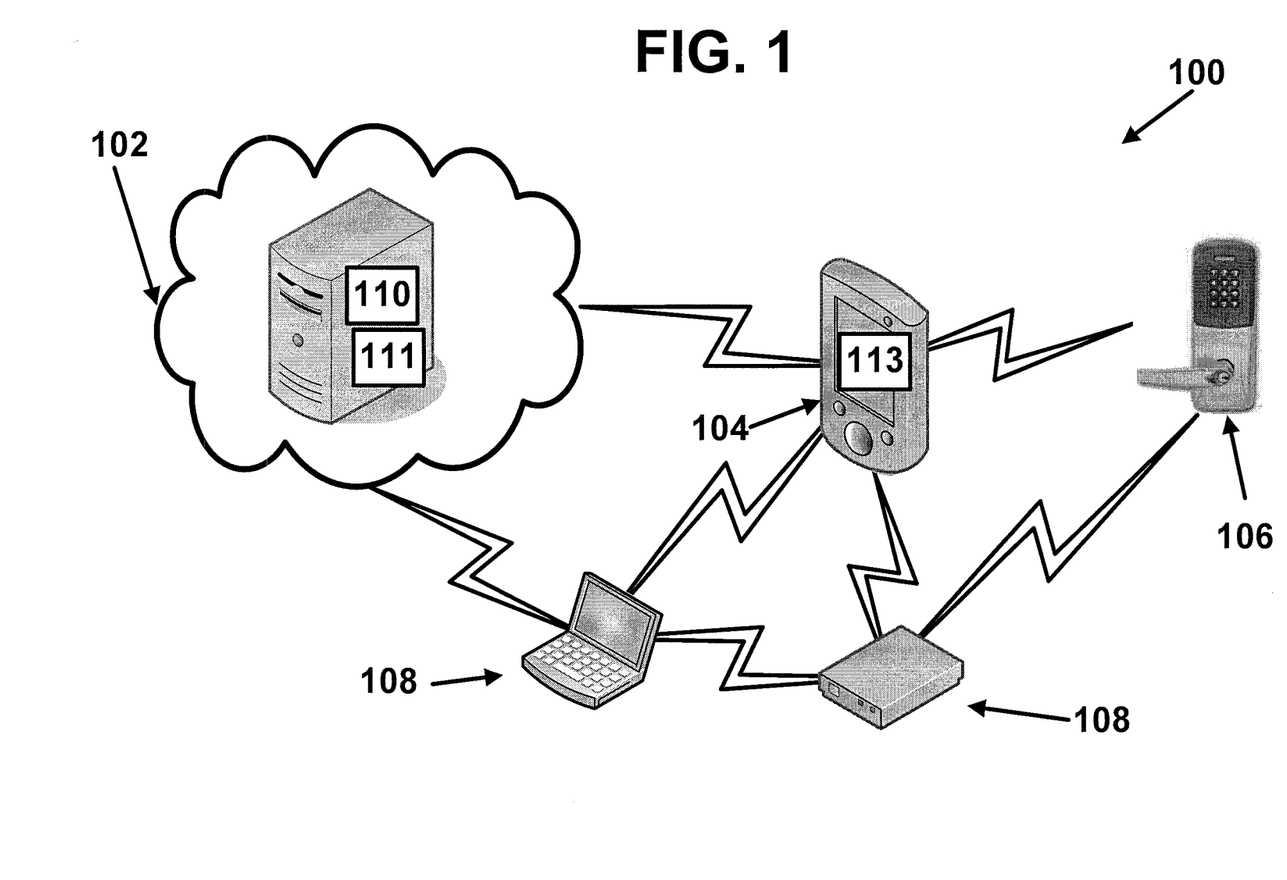
FIG. 1 is a schematic block diagram of an exemplary system.

FIG. 1 illustrates an exemplary system 100. In the embodiment shown in FIG. 1, the system 100 is an access control system. It is contemplated that in other embodiments, the system 100 may be a payment system, transit system, or any other system that utilizes a credential or a unique identifier. The system 100 includes a server 102, a mobile device 104, a reader device 106, and one or more wireless devices 108. The server 102 may provide a credential management service which, in the illustrated embodiment, includes a cloud application 110. The credential management service, via the cloud application 110, may generally maintain and host a database 111 of user configuration information, credentials, statuses, device configurations for user interfaces, updates, key management, credential management, tracking, notifications, access control information, alarm information and/or audit history information for assets. It is contemplated that the type of data stored in the database 111 may vary depending on the type of system (e.g., access control system, payment system, transit system, etc.). The server 102 may include multiple servers. Additionally, the server 110 may communicate with the mobile device 104 and/or the wireless device 108 via an Internet connection.

In the embodiment shown in FIG. 1, the mobile device 104 is a mobile phone such as, for example, a cell phone or smartphone. It is contemplated that in other embodiments, the mobile device 104 may be a tablet computer, a smartcard, or any other mobile computing device that can store data and communicate with the reader device 106. It is contemplated that the wireless devices 108 may be any type of computing device such as, for example, a desktop computer, a laptop computer, a tablet computer, a fob, an IP-to-Bluetooth smart bridge, and/or any other computing device having wireless communication capabilities. In the embodiment shown in FIG. 1, the reader device 106 is an electronic lock that is configured to communicate with the mobile device 104, one or more of the wireless devices 108, and the server 102 (via the mobile device 104). However, it is contemplated that in other embodiments, the reader device 106 may be any other type of device configured to receive and/or process credential information or a unique identifier. Other types of suitable reader devices 106 are also contemplated as would occur to those skilled in the art.

The mobile device 104 may include a Bluetooth transceiver configured to communicate with a Bluetooth transceiver that is part of the reader device 106. As used herein, the term Bluetooth includes Bluetooth Low Energy (BLE). It is contemplated that the mobile device 104 and the reader device 106 may communicate via a protocol other than Bluetooth such as, for example, near field communication (NFC) or any other appropriate communication protocol. The mobile device 104 also includes software and/or hardware such that the mobile phone 104 may communicate with the server 102 over the Internet, for example.

A user may generate user interface configurations for the reader device 106 by utilizing an application 113 on the mobile device 104. Additionally or alternatively, the user interface configurations may be selected and downloaded by the mobile device 104 from the server 102 via, for example, the cloud application 110. The mobile device 104 may communicate the user interface configurations to the reader device 106 based on selections made by the user. The reader device 106 may include software and/or hardware to receive and implement the user interface configurations from the mobile device 104.

The wireless devices 108 also include software and/or hardware such that the wireless devices 108 can communicate information wirelessly with the mobile device 104, the reader device 106, and/or other wireless devices 108 using, for example, Bluetooth. At least one wireless device 108, such as a bridge, may have a wired connection to the server 102 for communicating with the server 102 over the Internet, for example. The wireless devices 108 are also capable of receiving configuration changes via their user interfaces.

In the present application, the configuration of the user interface (UI) of the reader device 106 may be personalized by the individual user rather than the UI being set to a common, population-wide set of characteristics. A user may personalize their UI experience through a combination of server 102 and/or mobile device 104 based services. Moreover, a credential user may personalize their experience with a reader device 106 while maintaining and/or adhering to the system administration rules and security. Additionally, an administrator of the system 100 may also be able to uniquely customize the UI of the reader devices 106 in the system 100.

In the present application, configuration options may be allowed and/or disallowed by a cloud-based access control services (ACS) center on the server 102 as a "Policy". The configuration of user options may be stored on the mobile device 104. For example, a reader device 106 on a door (or another type of access restriction structure or device) may be set to unlock immediately so that input from a user is minimal, as in the case, for example, when a user's hands and/or arms are full of groceries so that the user can gain entrance with ease as they approach a particular door.

Configuration policy settings may be unique to the user and/or unique for each of the reader devices 106 on doors to which they may have access. In enterprise environments, Policy on Cloud may allow single sign-on in harmony with Windows and Active Directory, as well as other enterprise user log-in services. The server 102 may implement a Policy on Cloud based control of the cache mode on the reader device 106 in which configurations may be pushed to a reader device 106 through a mobile device 104.

Individual user policies may be dynamically set by an administrator and/or pushed by the ACS center at the server 102 to the user's mobile device 104. The user may then configure some or all of the policies or configurations received from the server 102 using the mobile device 104.

Access to a reader device 106 may be dynamically decided by a written information security policy (WISP) stored on the mobile device 104, in which the WISP has been previously pushed to the mobile device 104 from the server 102. The WISP may determine what zone/building/door access rights a user has for offline zones/buildings/doors.

The mobile device 104 may determine when to store (i.e., hold) information, send information to the server 102, and/or send information to a reader device 106 such as, for example, an electronic lock 106. This function may be used to optimize data transfer for frequently connected reader devices 106, and may be used to store and forward information to the reader devices 106 that are connected infrequently and/or outside the range of a "real-time" or frequent data connection to the server 102.

The user configuration options for a non-online credential 108 such as, for example, a wireless fob, may be managed by a compatible personal computer 108 if there is no ACS on the server 102, or by some other compatible communicating device such as, for example, an IP to wireless bridge 108 that is connected to the ACS in the server 102.

Manual programming of offline locks may be accomplished by the user via their mobile device 104. The user interface is used as a master programming credential/master programming device for the reader devices 106 such as, for example, residential electronic locks.

Americans with Disability Act settings may be configured by the user. As should be appreciated, disabled individuals may have varying levels of ability. Thus, options may be provided for a disabled user to select their comfort/challenge level for interacting with the reader device 106 and a user interface device such as, for example, a fob, a mobile device 104, and/or another wireless device 108.

A user may choose to use gestures in association with the mobile devices 104 and/or fobs that support gesture control. Gestures may vary from a simple strong tap on the device's housing to a more complex gesture such as, for example, rotating the device to emulate turning a door handle to be used as a verification to unlock the door. Custom user defined gestures may also be allowed to perform verification tasks. Custom user defined gestures may be created using the applications 113 on the mobile device 104.

Figure 2:
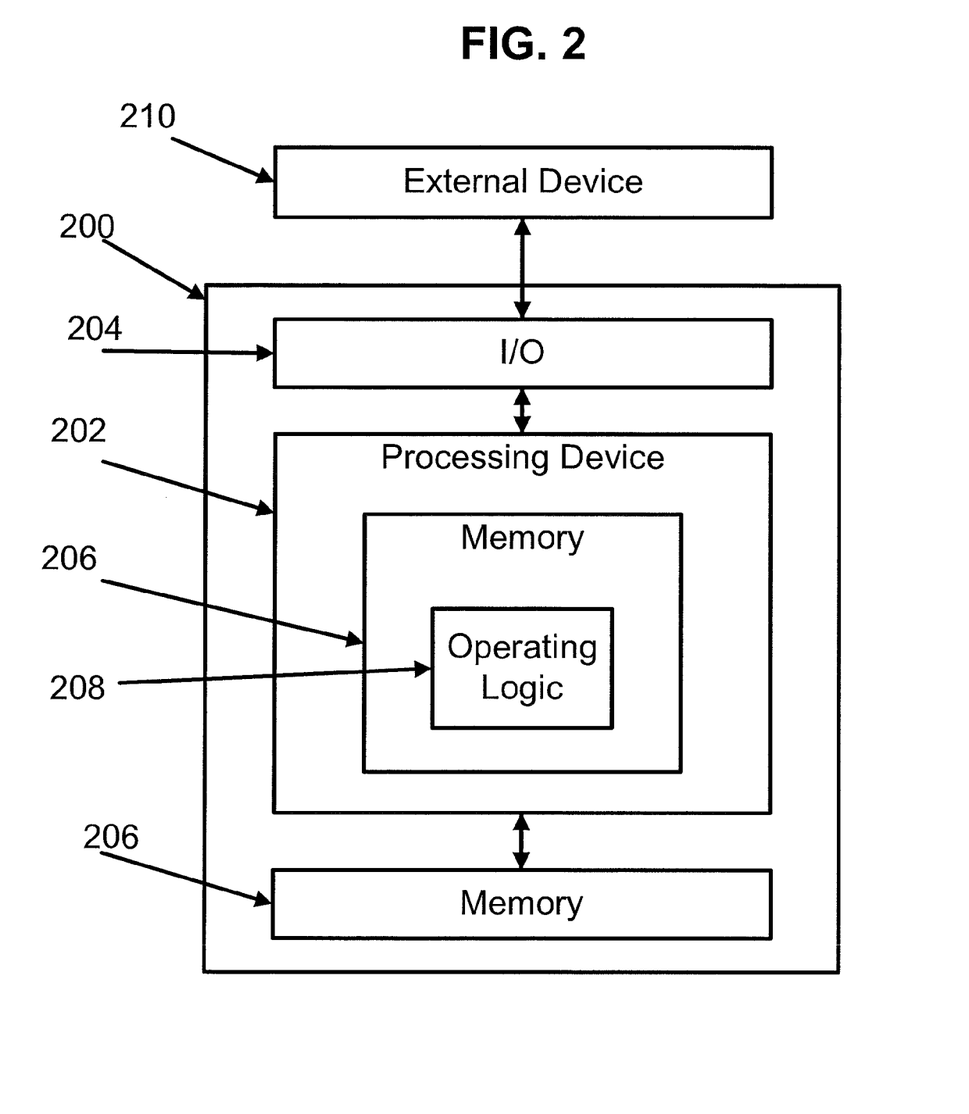
FIG. 2 is a schematic block diagram of an exemplary computing device.

FIG. 2 is a schematic block diagram of a computing device 200. The computing device 200 is one example of a server, a mobile device, a reader device and/or a wireless device configuration that may be utilized in connection with the server 102, the mobile device 104, the reader device 106, and/or the wireless devices 108 shown in FIG. 1. The computing device 200 includes a processing device 202, an input/output device 204, memory 206, and operating logic 208. Furthermore, computing device 200 communicates with one or more external devices 210.

The input/output device 204 allows the computing device 200 to communicate with the external device 210. For example, the input/output device 204 may be a transceiver, a network adapter, a network card, an interface, or a communication port (e.g., a USB port, serial port, parallel port, an analog port, a digital port, VGA, DVI, HDMI, FireWire, CAT 5, or any other type of communication port or interface). The input/output device 204 may include hardware, software, and/or firmware. It is also contemplated that the input/output device 204 may include more than one of these adapters, cards or ports.

The external device 210 may be any type of device that allows data to be inputted or outputted from the computing device 200. For example, the external device 210 may be a mobile device, a reader device, other electronic equipment, a handheld computer, a diagnostic tool, a controller, a computer, a server, a processing system, a printer, a display, an alarm, an illuminated indicator such as a status indicator, a keyboard, a mouse, or a touch screen display. Furthermore, it is contemplated that the external device 210 may be integrated into the computing device 200. It is further contemplated that there may be more than one external device in communication with the computing device 200.

The processing device 202 can be a programmable type, a dedicated hardwired state machine, or any combination thereof. The processing device 202 may further include multiple processors, Arithmetic-Logic Units (ALUs), Central Processing Units (CPUs), Digital Signal Processors (DSPs), or the like. Processing devices 202 with multiple processing units may utilize distributed, pipelined, and/or parallel processing. The processing device 202 may be dedicated to the performance of just the operations described herein, or may be utilized in one or more additional applications. In the depicted form, the processing device 202 is of a programmable variety that executes algorithms and processes data in accordance with operating logic 208, as defined by programming instructions (such as software or firmware) stored in memory 206. Alternatively or additionally, the operating logic 208 for the processing device 202 is at least partially defined by hardwired logic or other hardware. The processing device 202 may include one or more components of any type suitable to process the signals received from the input/output device 204 or elsewhere, and to provide desired output signals. Such components may include digital circuitry, analog circuitry, or a combination of both.

Memory 206 may be of one or more types, such as a solid-state variety, electromagnetic variety, optical variety, or any combination thereof. Furthermore, memory 206 can be volatile, nonvolatile, or a combination of these types, and some or all of memory 206 can be of a portable variety, such as a disk, tape, memory stick, cartridge, or the like. Additionally, memory 206 can store data that is manipulated by the operating logic 208 of the processing device 202, such as data representative of signals received from and/or sent to input/output device 204, in addition to or in lieu of storing programming instructions defining the operating logic 208, just to name one example. As shown in FIG. 2, memory 206 may be included with the processing device 202 and/or coupled to the processing device 202.

Figure 3:
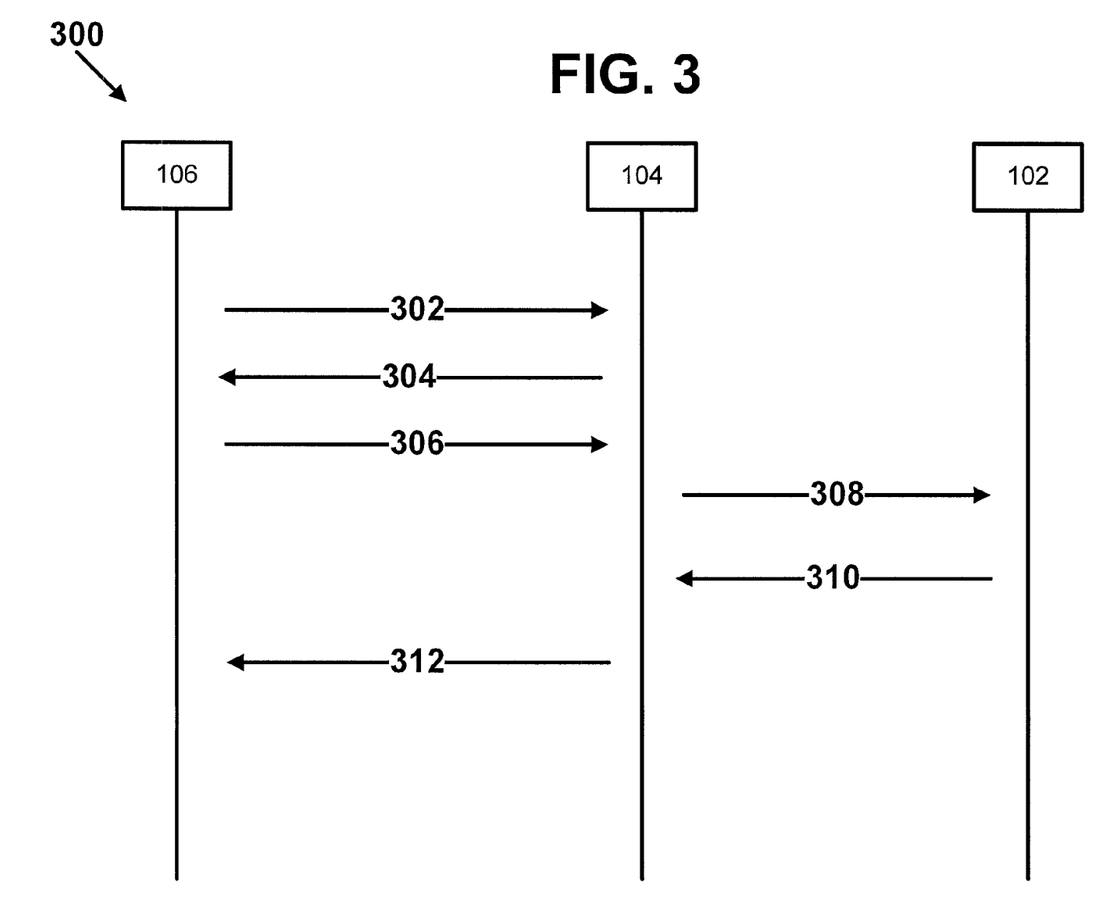
FIG. 3 is a schematic time sequence diagram for an exemplary process.

FIG. 3 illustrates a schematic time sequence diagram for another embodiment of the present invention including an exemplary process 300 for communicating data between the server 102 and the reader device 106 via the mobile device 104. Operations illustrated for all of the processes in the present application are understood to be examples only, and operations may be combined/divided and added/removed as well as re-ordered in whole or in part, unless explicitly stated to the contrary.

Process 300 begins with operation 302 in which the reader device 106 advertises to one or more of the mobile devices 104 that the reader device 106 is available for communication or connection. The reader device 106 may advertise to the mobile devices 104 by transmitting a Bluetooth signal continuously or intermittently. Additionally, the reader device 106 may advertise, for example, while in a low power sleep state. The reader device 106 may perform such advertising, for example, once every 'x' amount of time.

Process 300 then proceeds from operation 302 to operation 304. At operation 304, the mobile device 104 scans for devices in its communication range. The mobile device 104 may scan, for example, when the mobile device 104 is in a low power scan mode. When the reader device 106 is in range, the mobile device 104 may initiate communication with the reader device 106. For example, the mobile device 104 responds to the advertisement transmitted by the reader device 106 by sending one or more response messages, which in turn initiate and/or establish a connection between the mobile device 104 and the reader device 106 via Bluetooth communication, for example.

Process 300 then proceeds from operation 304 to operation 306. At operation 306, the reader device 106 may transmit a message that includes an encrypted reader device identification (ID) to the mobile device 104 via Bluetooth communication. It is contemplated that a unique identifier other than a reader device ID may be transmitted to the mobile device 104. Furthermore, it is contemplated that the mobile device 104 reader device ID may not necessarily be encrypted when it is transmitted to the mobile device 104.

Process 300 proceeds from operation 306 to operation 308. At operation 308, the mobile device 104 may transmit a message to the server 102 that includes the encrypted reader device ID and the mobile device ID. The server 102 may decrypt the reader device ID. Additionally, the server 102 may analyze the reader device ID and/or the mobile device ID to determine whether to grant or deny permission to the mobile device 104 to perform the requested function. For example, in an access control system, the server 102 may determine whether the mobile device 104 should be granted or denied access to the area secured by the reader device 106. As another example, in a payment system, the server 102 may determine whether to grant or deny a payment by the mobile device 104. In some embodiments, the server 102 may make the grant/deny decision in real-time.

Process 300 then proceeds from operation 308 to operation 310. At operation 310, the server 102 transmits a grant/deny message to the mobile device 104. In some embodiments, the grant/deny message may be encrypted.

Process 300 then proceeds from operation 310 to operation 312. At operation 312, the mobile device 104 utilizes the grant/deny message with the reader device 106. If the message is a grant, then the mobile device 104 will be granted access by the reader device 106. Conversely, if the message is a deny, then the mobile device 104 will be denied access by the reader device 106.

Figure 4:
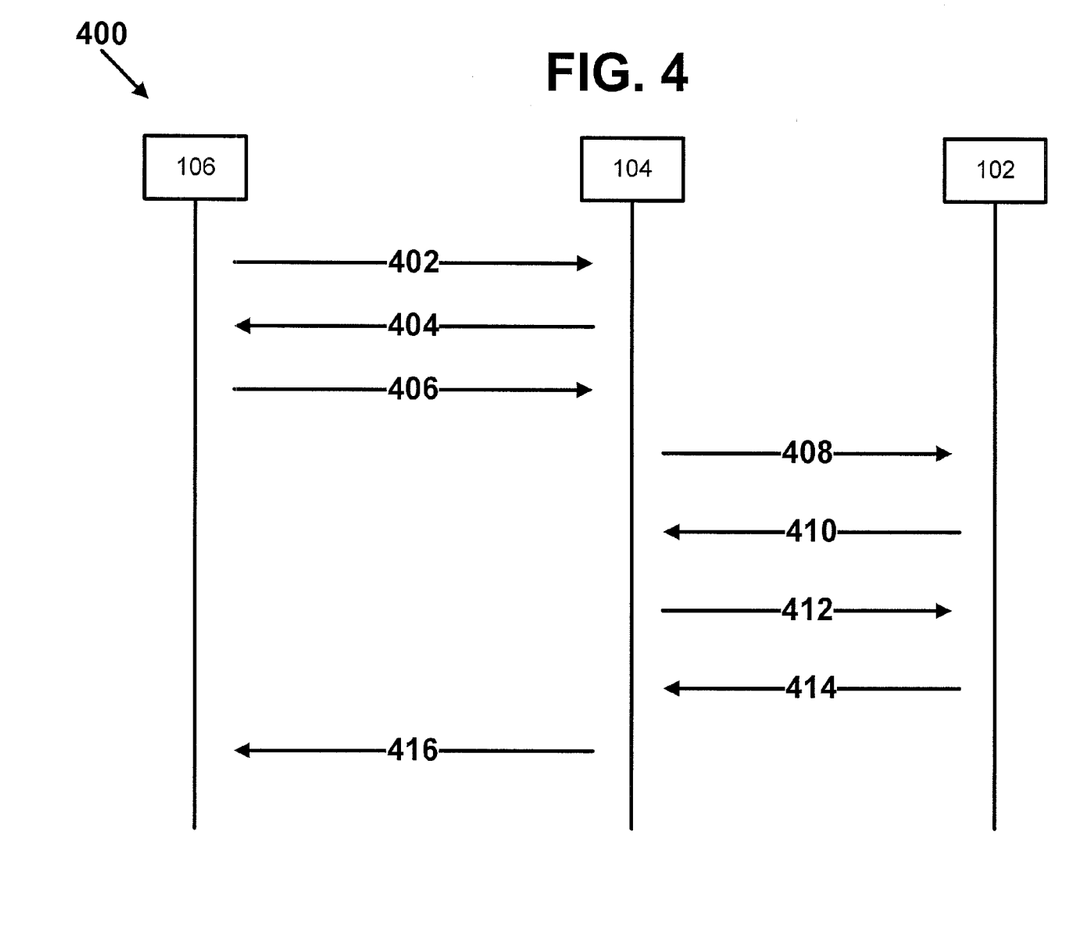
FIG. 4 is a schematic time sequence diagram for another exemplary process.

FIG. 4 illustrates a schematic time sequence diagram for another embodiment of the present application including an exemplary process 400 for communicating data between the server 102 and the reader device 106 via the mobile device 104 with additional credential information. Operations illustrated for all of the processes in the present application are understood to be examples only, and operations may be combined/divided and added/removed as well as re-ordered in whole or in part, unless explicitly stated to the contrary.

Process 400 begins with operation 402 in which the reader device 106 advertises to one or more mobile devices 104 that the reader device 106 is available for communication or connection. The reader device 106 may advertise to the mobile devices 104 by transmitting a Bluetooth signal continuously or intermittently. Additionally, the reader device 106 may advertise, for example, while in a low power sleep state. The reader device 106 may perform such advertising, for example, once every 'x' amount of time.

Process 400 then proceeds from operation 402 to operation 404. At operation 404, the mobile device 104 scans for devices within its communication range. The mobile device 104 may scan, for example, when the mobile device 104 is in a low power scan mode. When the reader device 106 is in range, the mobile device 104 may initiate communication with the reader device 106. For example, the mobile device 104 responds to the advertisement transmitted by the reader device 106 by sending one or more response messages, which in turn initiate and/or establish a connection between the mobile device 104 and the reader device 106 via Bluetooth communication, for example.

Process 400 then proceeds from operation 404 to operation 406. At operation 406, the reader device 106 may transmit a message that includes an encrypted reader device identification (ID) to the mobile device 104 via Bluetooth communication. It is contemplated that a unique identifier other than a reader device ID may be transmitted to the mobile device 104. Furthermore, it is contemplated that the mobile device 104 reader device ID may not necessarily be encrypted when it is transmitted to the mobile device 104.

Process 400 proceeds from operation 406 to operation 408. At operation 408, the mobile device 104 may transmit a message to the server 102 that includes the encrypted reader device ID and the mobile device ID. The server 102 may decrypt the reader device ID. Additionally, the server 102 may analyze the reader device ID and/or the mobile device ID to determine whether to grant or deny permission to the mobile device 104 to perform the requested function. For example, in an access control system, the server 102 may determine whether the mobile device 104 should be granted or denied access to the area secured by the reader device 106. As another example, in a payment system, the server 102 may determine whether to grant or deny a payment by the mobile device 104. The server 102 may make the grant/deny decision in real-time. In this example, the server 102 determines that additional credential information is needed to make the determination of whether to grant or deny access.

Process 400 then proceeds from operation 408 to operation 410. At operation 410, the server 102 transmits a message to the mobile device 104 requesting additional credential information.

Process 400 then proceeds from operation 410 to operation 412. At operation 412, the user of the mobile device 104 may then input the additional credential information into the mobile device 104. This input may be different credential types including, for example, a pin code, a passphrase, a gesture with the phone, and/or facial or voice recognition to the server 102. In another embodiment, the mobile device 104 automatically supplies the additional credential information. Once the mobile device 104 has the additional credential information, the mobile device 104 transmits the additional credential information to the server 102.

Process 400 then proceeds from operation 412 to operation 414. At operation 414, the server 102 receives the additional credential information and determines whether to grant or deny the request based on the reader device ID, the mobile device ID, and/or the additional credential information. The server 102 may make the decision in real-time. The server 102 then transmits a grant/deny message to the mobile device 104. In some embodiments, the grant/deny message may be encrypted.

Process 400 then proceeds from operation 414 to operation 416. At operation 416, the mobile device 104 utilizes the grant/deny message with the reader device 106. If the message is a grant, then the mobile device 104 will be granted access by the reader device 106. If the message is a deny, then the mobile device 104 will be denied access by the reader device 106.

In one embodiment, the system architecture in the present application generally provides a communication pipeline between the mobile device 104 and the server 102, which in turn allows the electronics resident on the door to have a relatively simpler and smaller form factor and design.

In another embodiment, installation of a real-time access control verification system may be performed without any wires. Furthermore, the reader device 106 may be battery powered and/or have the ability to "go online" through an Internet connection of the mobile device 104 or other wireless devices 108. In another embodiment, the mobile device 104 provides the communication path between the reader device 106 and the server 102, which may allow for a real-time access control decision, without a hardwired connection for the reader device 106.

The various aspects of the process 300 and/or 400 in the present application may be implemented in the operating logic 208 as operations by software, hardware, artificial intelligence, fuzzy logic, or any combination thereof, or at least partially performed by a user or operator. In certain embodiments, operations represent software elements as a computer program encoded on a computer readable medium, wherein the server 102, the mobile device 104, the reader device 106, and/or the wireless devices 108 perform the described operations when executing the computer program.

One aspect of the present application may include a system, comprising: a mobile device; and a reader device; and wherein the mobile device is configured to receive a user input to configure a personalized user interface configuration, wherein the mobile device is further configured to wirelessly transmit the personalized user interface configuration to a reader device; and wherein the reader device is configured to receive the personalized user interface configuration from the mobile device, to implement the personalized user interface configuration, to receive additional information from the mobile device, and to perform a function based upon the additional information and the personalized user interface configuration.

Features of the aspect of the present application may include: a cloud server configured to allow or disallow user interface configuration options based on a policy, wherein the mobile device is further configured to wirelessly communicate with the cloud server to receive at least one of user interface configuration options and the policy; wherein the policy is based upon identity of the mobile device; wherein the policy is based upon identity of the reader device; wherein the policy is pushed to the mobile device; a wireless device configured to communicate configuration information via Bluetooth with at least one of the mobile device and the reader device; wherein the wireless device is at least one of a fob, a computer, a reader and a bridge; wherein the wireless device is configured to communicate with a cloud server via a wired connection; wherein the mobile device and the reader device communicate wirelessly via Bluetooth.

Another aspect of the present application may include a method, comprising: personalizing a user interface configuration; transmitting the user interface configuration from a mobile device to a reader device; implementing the user interface configuration in the reader device; and performing via the reader device a function based upon the personalized user interface configuration.

Features of the aspect of the present application may include: determining via a cloud server whether to allow or disallow user interface configuration options based on a policy, wherein the mobile device is further configured to wirelessly communicate with the cloud server to receive at least one of the user interface configuration options and the policy; wherein the policy is based upon at least one of the identity of the mobile device and the identity of the reader device; wherein the policy is pushed to the mobile device; wirelessly transmitting configuration information from a wireless device to at least one of the mobile device and the reader device via Bluetooth; wherein the wireless device is at least one of a fob, a computer, a reader and a bridge; wherein the wireless device is configured to communicate with a cloud server via a wired connection; wherein the mobile device and the reader device communicate wirelessly via Bluetooth.

Yet another aspect of the present application may include an apparatus, comprising: a mobile device configured to personalize a user interface configuration stored on a cloud server, download the user interface configuration from the cloud server, transmit the user interface configuration to a reader device, and interact with the reader device to utilize the user interface configuration.

Features of the aspect of the present application may include: wherein the mobile device and the reader device communicate wirelessly via Bluetooth; wherein the mobile device is further configured to receive a policy from the cloud server via a pushed message.

Another aspect of the present application may include a method, comprising: establishing wireless communication between a mobile device and a reader device; transmitting a reader device identification from the reader device to the mobile device; transmitting the reader device identification and a mobile device identification from the mobile device to a server; determining via the server whether the mobile device is permitted access to the reader device based at least in part on the reader device identification and the mobile device identification; transmitting a grant/deny message from the server to the mobile device based upon the determining; and transmitting the grant/deny message from the mobile device to the reader device.

Features of the aspect of the present application may include: transmitting via the reader device an advertisement indicating a presence of the reader device to the mobile device; scanning via the mobile device for the advertisement; and wherein the establishing is performed by the reader device receiving a response to the advertisement from the mobile device; wherein the transmitting is performed while the reader device is in a low power sleep state; wherein the scanning is performed when the mobile device is in a low power scan mode; requesting via the server additional credential information from the mobile device; transmitting the additional credential information from the mobile device to the server; and wherein the determining is further based upon the additional credential information; further comprising inputting the additional credential information into the mobile device in response to the requesting; wherein the additional credential information includes data relating to at least one of a pin code, a passphrase, a gesture with the mobile device, facial recognition, and voice recognition; further comprising encrypting at least one of the reader device identification and the grant/deny message; wherein the reader device comprises an electronic lock.

Yet another aspect of the present application may include a system, comprising: a reader device; and a mobile device in communication with a server and in wireless communication with the reader device; and wherein the reader device has a reader device identification and is configured to transmit the reader device identification wirelessly to the mobile device; wherein the mobile device includes a mobile device identification and is configured to transmit the reader device identification and the mobile device identification to the server; wherein the server is configured to make a determination in real-time whether the mobile device is permitted access to the reader device based at least in part on the reader device identification and the mobile device identification, the server further configured to transmit a grant/deny message to the mobile device based on the determination; and wherein the mobile device is configured to transmit the grant/deny message to the reader device.

Features of the aspect of the present application may include: wherein the server comprises a cloud server; wherein at least one of the reader device identification and the grant/deny message is encrypted; wherein the mobile device comprises a smartphone; wherein the reader device comprises an electronic lock; wherein the reader device includes a low power sleep state; and wherein the reader device is configured to advertise its presence to the mobile device while in the low power sleep state; wherein the mobile device is configured to scan for one or more of the reader devices in wireless communication range and to initiate wireless communication with the one or more of the reader devices that are determined to be in wireless communication range; wherein the server is configured to transmit a message to the mobile device indicative of a requirement for additional credential information; and wherein a user of the mobile device is prompted to input the additional credential information into the mobile device.

Another aspect of the present application may include an apparatus, comprising: a mobile device configured to receive a reader device identification from a reader device via Bluetooth communication, transmit a mobile device identification and the reader device identification to a server via the Internet, receive a grant/deny message from the server, and transmit the grant/deny message to the reader device.

Features of the aspect of the present application may include: wherein the mobile device is further configured to receive a request from the server for additional credential information, receive a user input that includes additional credential information, and transmit the additional credential information to the server; wherein the additional credential information includes data relating to at least one of a pin code, a passphrase, a gesture with the mobile device, facial recognition, and voice recognition.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
a mobile device;
a reader device that is configured to receive and process credential information;
a cloud server connectable to the reader device through the mobile device, wherein the mobile device is configured to transmit a unique identifier of the reader device and a unique identifier of the mobile device to the cloud server, and the cloud server is configured to grant or deny access to the reader device through the mobile device in response to the unique identifier of the reader device and the unique identifier of the mobile device;
wherein the mobile device is configured to wirelessly communicate with the cloud server to receive at least one user interface configuration option and a policy that is based on a unique identifier of the reader device, wherein the policy is pushed to the mobile device from the cloud server, and the mobile device is further configured to receive a user input to configure a personalized user interface configuration, wherein the mobile device is further configured to wirelessly transmit the personalized user interface configuration to the reader device; and
wherein the reader device is configured to receive the personalized user interface configuration from the mobile device, to implement the personalized user interface configuration, to receive additional information from the mobile device, and to perform a function based upon the additional information and the personalized user interface configuration and the policy.

2. The system of claim 1, further comprising:
a wireless device configured to communicate configuration information via Bluetooth with at least one of the mobile device and the reader device.

3. The system of claim 2, wherein the wireless device is at least one of a fob, a computer, a reader and a bridge.

4. The system of claim 2, wherein the wireless device is configured to communicate with the cloud server via a wired connection.

5. The system of claim 1, wherein the mobile device and the reader device communicate wirelessly via Bluetooth.

6. A method, comprising:
connecting a reader device that receives and processes credential information to a cloud server through a mobile device;
transmitting a unique identifier of the reader device and a unique identifier of the mobile device to the cloud server with the mobile device;

from the cloud server, granting or denying access to the reader device in response to the unique identifier of the reader device and the unique identifier of the mobile device;

in response to granting access to the reader device, personalizing a user interface configuration for the reader device, wherein the mobile device is configured to wirelessly communicate with the cloud server to receive at least one user interface configuration option and a policy that is based on the unique identifier of the reader device, wherein the policy is pushed to the mobile device from the cloud server;

transmitting the user interface configuration from the mobile device to the reader device;

implementing the user interface configuration in the reader device; and performing via the reader device a function based upon the personalized user interface configuration and the policy.

7. The method of claim 6, further comprising:
wirelessly transmitting configuration information from a wireless device to at least one of the mobile device and the reader device via Bluetooth.

8. The method of claim 7, wherein the wireless device is at least one of a fob, a computer, a reader and a bridge.

9. The method of claim 7, wherein the wireless device is configured to communicate with the cloud server via a wired connection.

10. The method of claim 6, wherein the mobile device and the reader device communicate wirelessly via Bluetooth.

11. An apparatus, comprising:
a mobile device configured to transmit a unique identifier of the mobile device and a unique identifier of a reader device that receives and processes credential information to a cloud server and, in response to the cloud server granting access to the reader device in response to the unique identifiers of the mobile device and of the reader device, the mobile device further being configured to wirelessly communicate with the cloud server to receive at least one user interface configuration option and a policy that is based on the unique identifier of the reader device, wherein the policy is pushed to the mobile device from the cloud server, wherein the mobile device is further configured to personalize a user interface configuration based on the at least one user interface configuration option and the policy, transmit the user interface configuration to the reader device, and interact with the reader device to utilize the user interface configuration according to the policy.

12. The apparatus of claim 11, wherein the mobile device and the reader device communicate wirelessly via Bluetooth.

\* \* \* \* \*